United States Patent [19]
Miller

[11] Patent Number: 5,289,348
[45] Date of Patent: Feb. 22, 1994

[54] SHOCK ABSORBING RACK SYSTEM

[75] Inventor: Harold R. Miller, 6268 137th Ct., Apple Valley, Minn. 55124

[73] Assignee: Harold R. Miller, Apple Valley, Minn.

[21] Appl. No.: 979,056

[22] Filed: Nov. 19, 1992

[51] Int. Cl.$^5$ .............................. H02B 1/04
[52] U.S. Cl. ........................... 361/809; 248/614; 361/829; 369/263
[58] Field of Search ............... 361/332, 333, 334, 417, 361/419, 420, 429, 600, 601, 602, 807, 809, 810, 829; 68/23.1, 24; 369/263; 312/236; 248/581, 603-605, 610, 611, 614, 615, 201, 634, 638

[56] References Cited
U.S. PATENT DOCUMENTS

| | | | |
|---|---|---|---|
| 1,536,407 | 5/1925 | Pettus. | |
| 3,197,983 | 8/1965 | Ilmer | 68/24 |
| 3,243,154 | 3/1966 | Dryden | 248/358 |
| 4,106,500 | 8/1978 | Burchart | 128/36 |
| 4,475,184 | 10/1984 | Cooper | 369/263 |
| 4,705,257 | 11/1987 | Leo | 248/611 |
| 4,794,588 | 12/1988 | Yoshitoshi | 369/263 |
| 4,841,499 | 6/1989 | Takahashi | 369/263 |
| 4,937,806 | 6/1990 | Babson | 369/75.1 |

FOREIGN PATENT DOCUMENTS
894259 12/1981 U.S.S.R.

Primary Examiner—Gerald P. Tolin

[57] ABSTRACT

A rack with platforms for mounting electronic equipment is suspended by elastic straps within a frame. The frame is resiliently supported on legs that are attached only by means of elastic cords, which are configured to absorb shock, particularly horizontal shock.

7 Claims, 2 Drawing Sheets

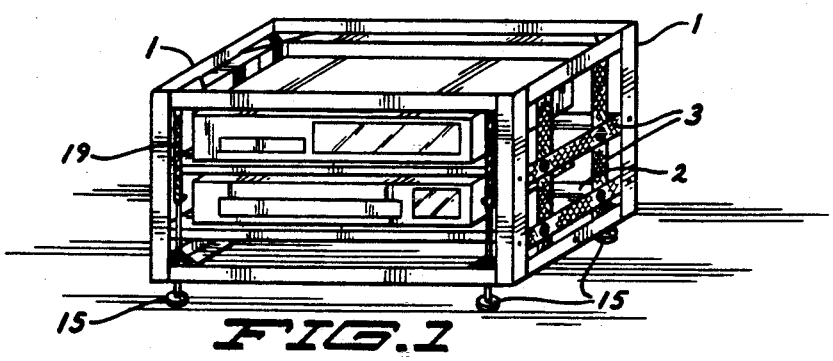
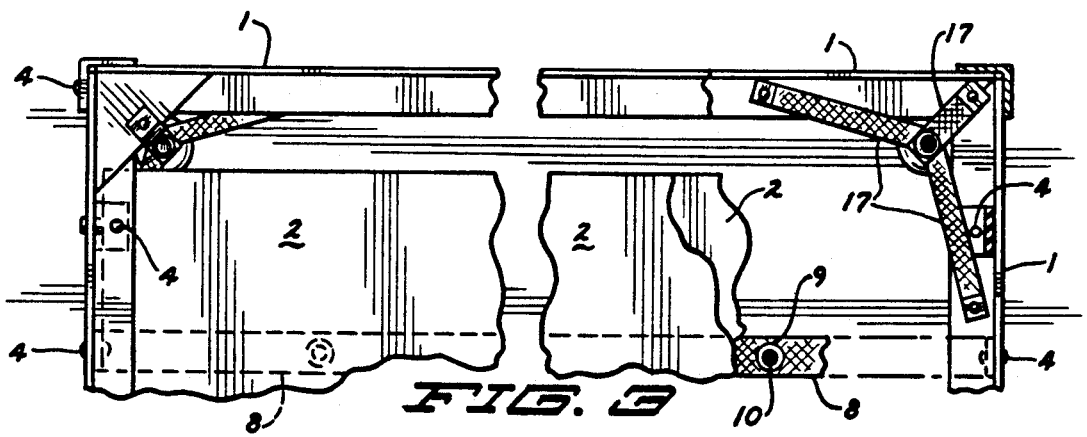
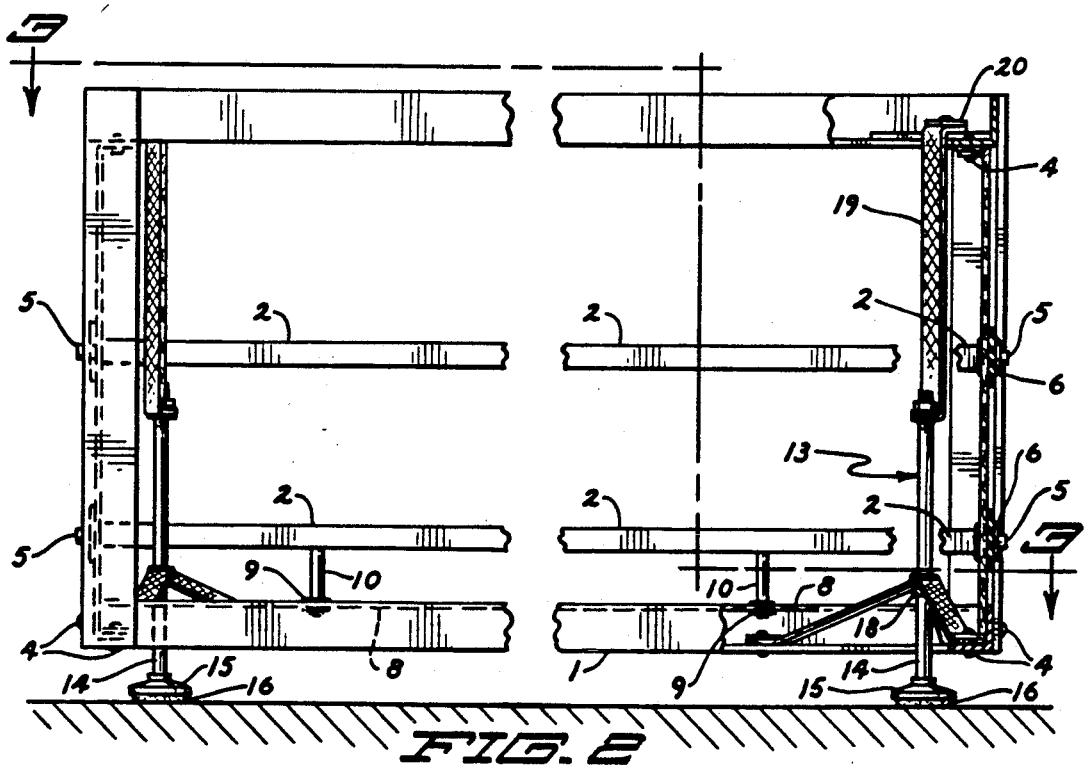

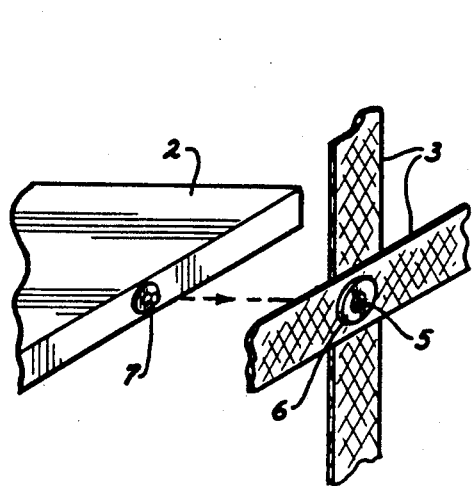
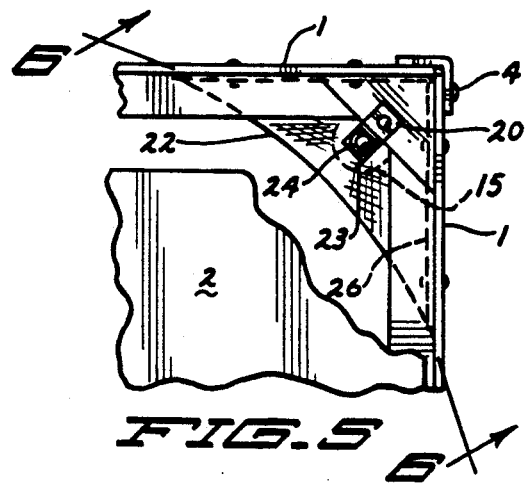
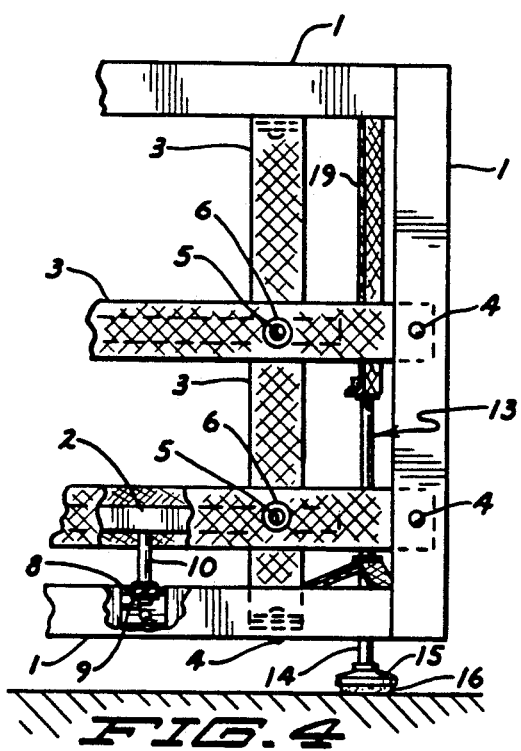
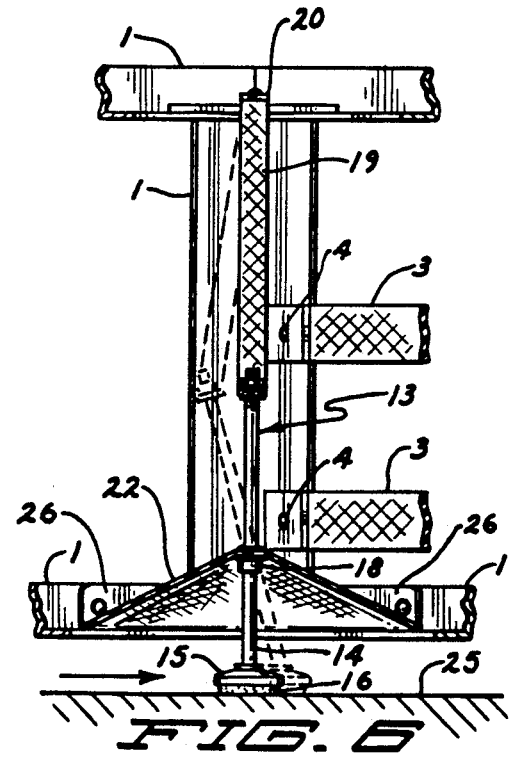

SHOCK ABSORBING RACK SYSTEM

BACKGROUND OF THE INVENTION

This invention relates to shock and vibration mounting for electronic equipment, and more particularly to an improved suspension involving elastic material under tension.

Shock and vibration are perennial concerns in mounting equipment, particularly electronic playback devices such as compact disk players. These problems are acute for those who use compact disk players for public gatherings, at which music is generally loud, a pause capability is essential, and where people may accidentally bump the furniture on which the equipment is placed. The resulting shock is particularly severe in horizontal displacement.

Most resilient mounting systems depend on compression of elastic material for supporting vulnerable equipment. For example, Dryden (1964) discloses a vibration damping, system using springs and gas pressure for use in space vehicles. Some damping systems target a particular kind of motion; for example, a patent by Ilmer (1962) compensates for turning of a rotor assembly. An elaborate damping medium is disclosed by Cooper et al. (1984); a turntable floats in liquid, held in position by magnetic repulsion. Pettus (1925) discloses use of springs under tension for mounting an automotive tail light assembly, which reduces shock but does not provide damping. However, none of these anticipate the simple configuration of stretched rubber suspension members of the present invention.

One object of this invention is a suspension for electronic playback equipment using economical rubber straps to absorb shock and vibration. Another object is two levels of shock absorbing suspension: one between a rack and an outer frame, and another between the frame and each supporting leg. Still another object is a suspension that absorbs severe horizontal shock in particular.

SUMMARY OF THE INVENTION

This invention relates to a mounting system that employs elastic material under tension for damping shock and vibration. Platforms for mounting electronic equipment are removably installed within a frame by attaching them to rubber straps that are stretched from opposite sides of the frame. The frame is resiliently supported on four legs, each of which is connected to the frame only by means of elastic cords. The arrangement of cords particularly absorbs horizontal shock by allowing the legs to tilt.

DESCRIPTION OF THE DRAWINGS

FIG. 1 is a perspective view of the invention.

FIG. 2 is a front sectional view.

FIG. 3 is a top sectional view along line 3—3 of FIG. 2.

FIG. 4 is a partial end view showing means of attaching platforms to rubber straps.

FIG. 5 is a top view of one corner showing as alternative means of mounting a leg on the frame.

FIG. 6 is a sectional view along line 6—6 of FIG. 5.

FIG. 7 is a partial perspective view showing an alternative means of attaching platform to rubber straps.

DETAILED DESCRIPTION

FIG. 1 shows a frame 1 within which platforms 2 may be installed for mounting compact disk players or other electronic equipment. Such equipment may be secured to the platforms 2 with screws or other fasteners. A network of rubber straps 3 is provided at each end of the frame 1 to provide a resilient mounting for the platforms 2. Each rubber strap 3 is stretched between anchoring points 4 (FIGS. 2, 3 & 4) on the frame 1.

The network of rubber straps has members 3 extending in different directions, as shown in FIG. 1, and the platforms 2 are attached to the rubber straps 3 at a point on each strap 3 between its anchoring points 4 on the frame 1.

Rubber straps 3 under tension absorb vibration better than a suspension with rubber bushings, which rely on compression. An experiment demonstrated that a suspension using stretched rubber straps solved problems of skipping that plagued one expensive dual chassis CD player, which had been taken off the market.

The straps 3 are provided with holes and grommets 6 for insertion of studs 5 when mounting the platforms 2. The holes and grommets 6 and the studs 5 pass through both vertical and horizontal straps 3 for stabilization in both dimensions. FIGS. 2, 3 & 4 also show an optional longitudinal rubber strap 8 with a hole 9 for receiving a stud 10 on the bottom of one of the platforms 2. An alternative means of attachment (FIG. 7) is a conventional snap fastener, with a male part 7 instead of a stud 5 to fit into the hole 51 in a grommet 6.

Panels (not shown) lined with sound absorbing material may be used to cover openings in the frame 1, in order to baffle and attenuate airborne vibration.

The frame 1 is supported at each bottom corner by means of a resiliently mounted leg, which comprises a shaft 13 & 14 and a foot 15. The foot 15 may also have an attached rubber tip 16. In the preferred embodiment (FIGS. 2, 3 & 4) the frame 1 is supported by three radial elastic cords 17, each of which is attached to the frame 1 and to a lower collar 18 on the shaft 13 & 14. A stabilizing elastic cord 19 tends to keep the shaft 13 & 14 in a vertical position and prevents it from dropping out of position when the frame 1 is lifted. The stabilizing elastic cord 19 is secured at one end by an attachment 20 on the frame 1, and secured at the other end by an upper collar 21 on the top end of the shaft 13.

FIGS. 5 & 6 show another embodiment of the invention in which an elastic membrane 22 is used instead of the radial elastic cords 17. A hole 23 in the membrane 22 accommodates the lower part of the shaft 14, and a grommet 24 prevents the hole 23 from being pulled down past the lower collar 18. The membrane 22 is attached to the frame 1 with attachment plates 26. The membrane 22 is distended upward by weight on the frame 1.

FIG. 6 illustrates how the leg 13, 14 & 15 responds to horizontal shock, which may be caused by a person inadvertently bumping the furniture on which the equipment is resting. As the supporting surface 25 moves horizontally (indicated by the arrow), the leg 13 readily pivots to absorb the shock (indicated by the dotted line image). While this principle is easiest to visualize with this embodiment, it is equally applicable to the preferred embodiment.

I claim:

1. A suspension system for electronic equipment comprising:
   a frame with a plurality of anchoring points;
   a plurality of rubber straps stretched between said anchoring points on said frame and extending in different directions; and
   at least one platform mounting said electronic equipment, which platform is attached to said rubber straps at a point on each strap between said anchoring points on said frame.

2. A suspension system for electronic equipment as described in claim 1, in which said platform is the chassis of said electronic equipment.

3. A suspension system for electronic equipment as described in claim 1, in which each of said attachments for said platform comprises:
   a stud on said platform; and
   a hole in at least one of said elastic straps.

4. A suspension system for electronic equipment as described in claim 1, in which said attachments for said platform are snap fasteners.

5. A suspension system for electronic equipment comprising:
   a frame within which said electronic equipment is mounted;
   a plurality of legs, each of which is partly within said frame and partly extending below said frame;
   a lower collar and an upper collar fixedly mounted on each of said legs;
   a plurality of elastic means of suspension, each connecting one of said lower collars to said frame; and
   a plurality of stabilizing elastic cords, each attached at one end to said frame, and at the other end to one of said upper collars.

6. A suspension system for electronic equipment as described in claim 5, in which said elastic means of suspension comprises a plurality of radial elastic cords, each attached at one end to one of said lower collars and at the other end to said frame.

7. A suspension system for electronic equipment as described in claim 5, in which said elastic means of suspension is a membrane with a hole so that it fits around one of said legs and against said lower collar.

* * * * *